(12) United States Patent
Minasian et al.

(10) Patent No.: US 6,681,065 B1
(45) Date of Patent: Jan. 20, 2004

(54) HIGH Q OPTICAL MICROWAVE PROCESSOR USING HYBRID DELAY-LINE FILTERS

(75) Inventors: Robert Minasian, Lindfield (AU); Ningsi You, Hillsdale (AU)

(73) Assignee: The University of Sydney, Sydney (AU)

(*) Notice: Subject to any disclaimer, the term of this patent is extended or adjusted under 35 U.S.C. 154(b) by 0 days.

(21) Appl. No.: 09/787,156

(22) PCT Filed: Sep. 24, 1999

(86) PCT No.: PCT/AU99/00819

§ 371 (c)(1),
(2), (4) Date: Jun. 6, 2001

(87) PCT Pub. No.: WO00/19249

PCT Pub. Date: Apr. 6, 2000

(30) Foreign Application Priority Data

Sep. 25, 1998 (AU) .............................................. PP6171

(51) Int. Cl.[7] .................................................. G02B 6/26
(52) U.S. Cl. .............................. 385/27; 385/15; 385/39; 398/85
(58) Field of Search .............................. 385/27, 15, 39; 398/85

(56) References Cited

U.S. PATENT DOCUMENTS

| | | | |
|---|---|---|---|
| 4,692,723 A | * 9/1987 | Fiedziuszko et al. ....... 333/202 |
| 4,768,850 A | 9/1988 | Moslehi et al. | |
| 5,434,937 A | 7/1995 | Glance | |
| 5,485,299 A | 1/1996 | Jones | |
| 5,513,090 A | * 4/1996 | Bhattacharya et al. ........ 363/40 |
| 5,548,165 A | * 8/1996 | Mohan et al. ................. 307/36 |
| 5,567,994 A | * 10/1996 | Davis et al. ................ 307/105 |
| 5,570,440 A | 10/1996 | Mizrahi | |
| 5,677,786 A | * 10/1997 | Meli ........................ 359/341.1 |
| 5,822,476 A | * 10/1998 | Jopson ........................ 385/27 |
| 5,825,520 A | 10/1998 | Huber | |
| 5,910,889 A | * 6/1999 | Larsen et al. ................. 363/40 |
| 6,016,371 A | * 1/2000 | Wickham et al. ............. 385/10 |
| 6,160,660 A | * 12/2000 | Aina et al. ............... 359/341.2 |
| 6,344,914 B1 | * 2/2002 | Shimojoh et al. ........... 359/177 |
| 6,445,848 B1 | * 9/2002 | Islam et al. .................... 385/24 |
| 6,549,701 B1 | * 4/2003 | Baney et al. ................. 385/27 |
| 2001/0002202 A1 | * 5/2001 | Feher ......................... 375/130 |

FOREIGN PATENT DOCUMENTS

JP 06334607 A * 12/1994 ........... H04B/10/04

OTHER PUBLICATIONS

D. Hunter, R. Minasian, "Microwave optical filters using in–fibre Bragg grating arrays," IEEE Microw. Guided Wave Lett., pp. 103–105, 1996.

F. Coppinger, S. Yegnanararayanan, P.D. Trinh, B. Jalali, and I. L. Newberg, "Nonrecursive Tunable Photonic Filter Using Wavelength–Selective True Time Delay," IEEE Photon. Technol. Lett., vol. 8, pp. 1214–1216, 1996.

T. Cussick, S. Iezekiel, R. Miles, "Al–Optical Microwave Filter Design Employing a Genetic Algorithm," IEEE Photon, Technol. Lett., vol. 10, pp. 1156–1158, 1998.

(List continued on next page.)

Primary Examiner—John D. Lee
Assistant Examiner—Daniel Valencia
(74) Attorney, Agent, or Firm—Ladas & Parry

(57) ABSTRACT

A hybrid active-passive signal bandpass filter comprising an active filter arranged in use to operate at a fundamental frequency which is a sub-multiple of a desired filter frequency of the bandpass filter, and a passive filter arranged in use to eliminate any pass bands in the frequency response of the active filter other than at the desired filter frequency for providing the pass band signal of the bandpass filter.

10 Claims, 9 Drawing Sheets

HYBRID FILTER STRUCTURE & THE EXPERIMENTAL SETUP
NOTE: l₁, l₂, l₃ ARE LENGTH DIFFERENCES OF OPTICAL DELAY BETWEEN THE TWO PATHS.

OTHER PUBLICATIONS

Hunter, R. Minasian, "Reflectively tapped fibre optic transversal filter using in–fibre Bragg gratings," Electron. Lett., vol. 31, pp. 1010–1012, 1995.

IEEE Transactions on Microwave Theory and Techniques, vol. 47, No. 7, issued Jul. 1999, Minasian R A and You N, "A Novel High–Q Optical Microwave Processor using Hybrid Delay Line Filters", pp. 1304–1308.

D. Hunter, R. Minasian, "Photonic Signal Processing of Microwave Signals Using an Active–Fiber Bragg–Grating–Pair Structure," IEEE Trans. Microw. Theory Tech., vol. 45, pp. 1463–1466, 1997.

H. Taylor, S. Gweon, S. Fang, C. Lee, "Fiber optic delay–lines for wideband signal processing," Proc. SPIE, vol. 1562, pp. 264, 1991.

K.P. Jackson, S. A. Newton, B. Moslehi, M. Tur, C.C. Cutler, J.W. Goodman, H.J. Shaw, "Optical Fiber Delay–Line Signal Processing," IEEE Trans. Microw. Theory Tech., vol. MTT–33, No. 3, pp. 193–209, 1985.

Frankel, R. Esman, "Fibre–optic tunable microwave transversal filter," IEEE Photon. Technol. Lett., pp. 191–193, 1995.

D. Norton, S. Johns, C. Keefer, R. Soref, "Tunable Microwave Filtering using High Dispersion Fiber Time Delays," IEEE Photon, Technol. Lett., vol. 6, pp. 831–832, 1994 [5] D.

Foord, P. Davis, A. Greenhalgh, "Synthesis of microwave and millimeter wave filters using optical spectrum slicing," Electron. Lett. Pp. 390–391, 1996.

Robert A. Minasian, Photonic signal processing of high–speed signals using fibre gratings, Microwave Photonics, 1999. MWP '99. International Topical Meeting on Melbourne, Vic., Australia Nov. 17–19 1999, Piscataway, NJ, USA, IEEE, US, Nov. 17, 1999 pp. 219–222, XPO10367445 ISBN: 0–7803–5558–X.

Jackson K P et al: "Optical Fiber Delay–Line Signal Processing" IEEE Transactions on Microwave Theory and Techniques, IEEE Inc. New York, US, vol. MTT– 33, No. 3,Mar. 1985, pp. 193–210, XP000955400 ISSN: 0018–9480.

Behzad Moslehi et al.: "Novel Amplified Fiber–Optic Recirculating Delay Line Processor" Journal of Lightwave Technology, IEEE. New York, US, vol. 10, No. 8, Aug. 1, 1992, pp. 1142–1147, XP000371909 ISSN: 0733–8724.

Coleman J O: "Choosing Nonuniform TAP Spacing For A Tapped–Delay–Line Filter" IEEE Transactions on Circuts and Systems II: Analog and Digital Signal Processing, IEEE Inc. New York, US, vol. 43, No. 4 Apr. 1, 1996, pp. 298–303, XP000592022 ISSN: 1057–7130.

Coppinger F et al: "Nonrecursive Tunable Photonic Filter Using Wavelength–Selective True Time Delay" IEEE Photonics Technology Lettters, IEEE Inc. New York, US., vol. 8, No. 9, Sep. 1, 1996, pp. 1214–1216, XP000624878 ISSN: 1041–1135.

* cited by examiner

HYBRID FILTER STRUCTURE & THE EXPERIMENTAL SETUP
NOTE: $l_1, l_2, l_3$ ARE LENGTH DIFFERENCES OF OPTICAL DELAY BETWEEN THE TWO PATHS.

COMPUTED FREQUENCY RESPONSE OF
THE COMBINED STRUCTURE WITH
OPTICAL DELAY LENGTHS OF NOTCH
FILTERS AS $1/8 L_{act}$, $1/4 L_{act}$ & $1/2 L_{act}$

———— COMBINED STRUCTURE
– – – – ACTIVE DELAY LINE

IMPULSE RESPONSE OF THE HYBRID FILTER WITH M=1,2,4 AND N=8 IN TIME DOMAIN.
PULSES AFTER THE THIRD PASSIVE FILTER.

DIAGRAM OF THE HYBRID DELAY-LINE FILTER INCLUDING THE POST FILTER WITH TWO PHOTO DETECTORS.
NOTE: $l_4$ IS THE LENGTH DIFFERENCE OF THE POST FILTER.

MEASURED FREQUENCY RESPONSE OF
SIMPLE ACTIVE DELAY LINE FILTER

MEASURED FREQUENCY RESPONSE OF THE
HYBRID DELAY LINES

MEASURED FREQUENCY RESPONSE OF HYBRID
FILTER INCLUDING A POST-FILTER

HIGH Q OPTICAL MICROWAVE PROCESSOR USING HYBRID DELAY-LINE FILTERS

FIELD OF THE INVENTION

The present invention relates to the field of filtering and in particular discloses an optical filtering method and apparatus.

BACKGROUND OF THE INVENTION

Photonic processors for microwave signal processing functions are attractive because of their very high time-bandwidth product capabilities. Such processors can remove the bottlenecks caused by limited sampling speeds in conventional electrical signal processors. In addition, they have excellent isolation, immunity to electromagnetic interference (EMI), and remove the limitations of Optical/Electrical and Electrical/Optical conversions for processing high speed signals that are already in the optical domain. Photonic processors also have the ability of attaining extremely high resolution and microwave frequencies.

Recently, there has been considerable interest in photonic processing for microwave filtering applications, and a variety of structures have been reported. A common objective is to increase the Q and frequency selectivity of these filters. This is more difficult to realise for bandpass filters, because it requires an increase in the number of taps in the discrete time signal processor. For this reason, passive structures for photonic processors give limited Q values. Active structures can achieve much higher Q values, but are limited by the requirement that they operate close to the lasing threshold. Also, the fundamental frequency and finesse of these filters is limited because of the minimum length of erbium fibre that can be used. Previously, the present inventors have reported an active photonic signal processor that exhibits a Q of 325, however it is difficult to increase the Q further in this structure because of the onset of lasing.

SUMMARY OF THE PRESENT INVENTION

In accordance with a first aspect of the present invention, there is provided an active-passive signal bandpass filter comprising:

an active filter an active filter arranged in use to operate at a fundamental frequency which is a sub-multiple of a desired filter frequency of the bandpass filter; and a passive filter arranged in use to eliminate any pass bands in the frequency response of the active filter other than at the desired filter frequency for providing the pass band signal of the bandpass filter.

The active filter can comprise an infinite impulse response filter and the passive filter can comprise a finite impulse response filter.

The active and passive filters can operate on photonic signals and an input signal to the bandpass filter can comprise an optical input signal. The filter preferably operates at microwave frequencies and the input signal can be created via the modulation of the optical signal by a microwave frequency optical oscillator.

The passive filter can comprise a plurality of passive filter elements each comprising a notch filter which, in combination, have high attenuation characteristics for frequencies outside the desired filter frequency and low attenuation of the desired filter frequency. The number of passive filter elements can, for example, be 3.

The passive filter may be formed from optical fibre components.

Alternatively, the passive filter may be formed from optical planar integrated circuits.

A post filter element can be further interconnected to the passive filter, the post filter element providing for further rejection of non desired filter frequencies.

The active filter may comprise an active delay line filter.

The active delay line filter can comprise an optical fibre which comprises two gratings that define a pass length between them, the optical fibre being erbium doped and the active delay filter further comprising a pump laser for providing the gain of the active delay line filter.

Alternatively, the active filter may comprise an optical planar integrated circuit.

The optical planar integrated circuit may comprise optical waveguides for providing the delay function of the active delay line filter and doped optical waveguides for providing the gain function of the active delay line filter; and waveguide gratings in the optical waveguides defining a pass length therebetween.

The active filter may be a tunable active filter for wavelength tuning the filter frequency of the filter.

In one embodiment, the tunable active filter may comprise chirped gratings defining a plurality of path lengths, each path length being associated with a predetermined wavelength of a laser pumping the active delay line filter.

This can enable the filter frequency to be changed.

The present invention may alternatively be defined as providing a photonic processor having a quality factor in excess of about 325.

BRIEF DESCRIPTION OF THE DRAWINGS

Notwithstanding any other forms which may fall within the scope of the present invention, preferred forms of the invention will now be described, by way of example only, with reference to the accompanying drawings in which.

DESCRIPTION OF THE PREFERRED AND OTHER EMBODIMENTS

1. Introduction

In the preferred embodiments, a new topology for a photonic signal processor is presented which overcomes previous limitations and enables both a high Q and a high frequency of operation to be obtained.

The structure of the preferred embodiment is based on a hybrid filter approach which combines both active filter and passive filter sections. The active section is operated at a sub-multiple of the desired filter frequency. Hence it can achieve a much narrower 3 dB bandwidth response, for a given gain margin. The passive sections are used to eliminate the intermediate peaks, and to select the multiple that corresponds to the desired filter frequency. The advantages of this structure are that it enables a significant increase in Q to be obtained, it can function at higher frequencies, and it has a very robust operation. Using this new topology, a very high resolution microwave signal filtering system was constructed with measured Q values of 801 for the hybrid processor. An extension to this principle is also described as an alternative embodiment and includes an additional passive optical stage, and results demonstrate a narrowband filter response with a Q of 983.

The new hybrid active-passive photonic processor topology for microwave signal filtering is presented in Section 2 below. The synthesis procedure for designing the hybrid filter to obtain a specified filter frequency is described in Section 3. Coherence effects are discussed in Section 4. The design of higher order passive filters to increase the Q of the hybrid filter are described in Section 5. Finally, Section 6 describes experimental results on the hybrid processor, which demonstrate the high Q characteristics.

Figure 1:
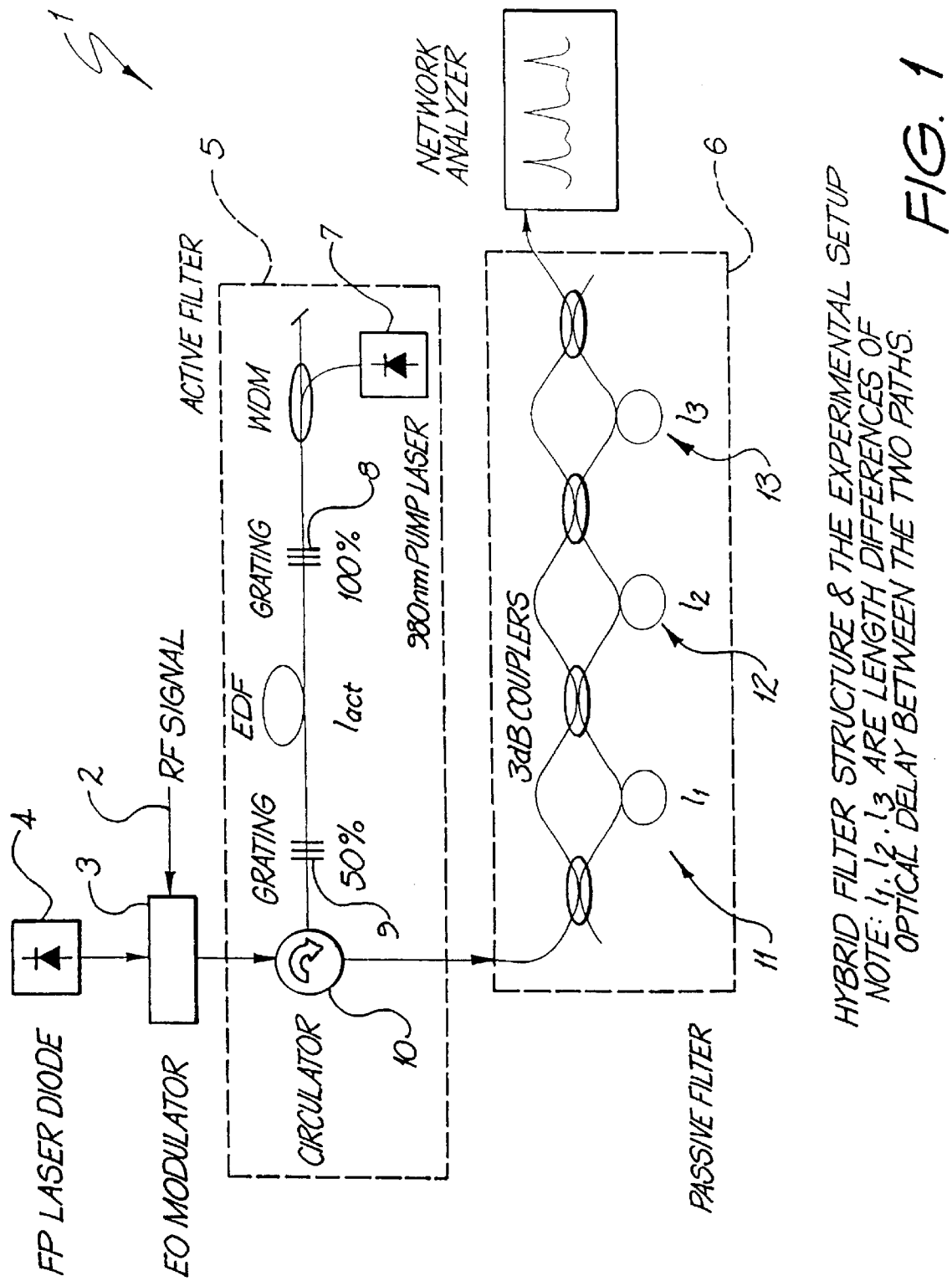
FIG. 1 is a schematic illustration of a first embodiment.

FIG. 1 illustrates a first embodiment 1 in which an RF input signal is input 2 to an electro optic modulator 3 which modulates the intensity of the output from laser 4. The output from modulator 3 passes through a first active filter section 5 before passing to a second passive filter section 6. The active filter 5 comprises a series of Bragg gratings 8, 9 on either side of an erbium doped fiber 10. The active filter acts as an infinite impulse response filter. The output from active filter 5 is forwarded via circulator 10 to the passive filter 6 which consists of a series of cascaded filters 11–13.

2. Hybrid Active-Passive Microwave Optical Filter Topology

Figure 2:
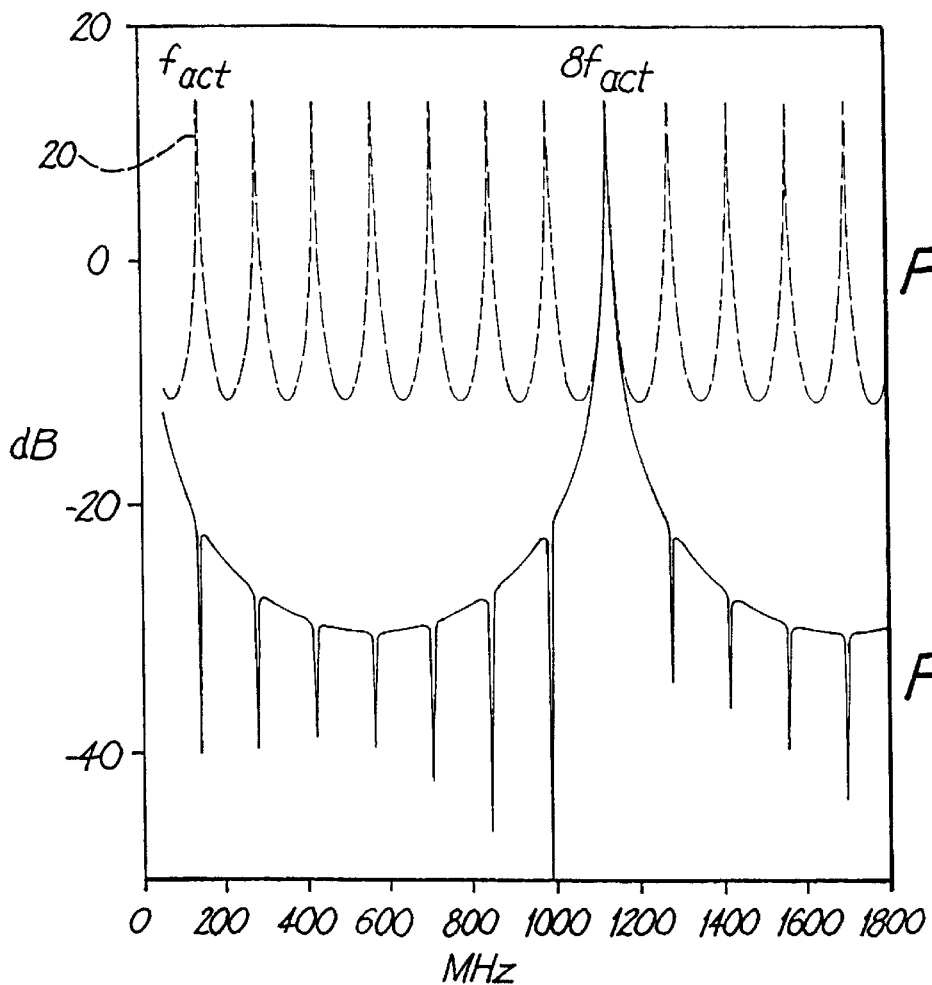
FIG. 2a is a graph illustrating an active filter response.
FIG. 2b illustrates a computed filter response of a first embodiment.

Considering first the active filter 5 on its own, it includes a response structure as illustrated in FIG. 2a with its characteristics being defined by a first order peak 20 at frequency $f_{1act}$ $$f_{1act} = \frac{c}{nl_{act}} \quad \text{(EQ 1)}$$

where $l_{act}$ is the double pass length between the front 9 and rear 8 gratings; and the 3 dB bandwidth of its response peaks 20 is given by $$\Delta f_{act} = \frac{\arccos\frac{-1 + 2G - 0.25G^2}{G}}{\pi T_{act}} \quad \text{(EQ 2)}$$

where $T_{act} = nl_{act}/c$. Eq(2) is derived from a transfer function analysis of the active delay line, with first grating 9 reflectivity of 50%, second grating reflectivity 8 of 100%, and a double pass gain of G in the active fibre.

If we realise a fundamental frequency filter of $f_{filter}$ directly using only the active filter then the required active filter length is $$l'_{act} = \frac{c}{nf_{filter}} \quad \text{(EQ 3)}$$

The Q of this filter which is defined as $$Q = f_{filter}/\Delta f \quad \text{(EQ 4)}$$

and is given by $$Q = \frac{\pi}{\arccos\left(\frac{-1 + 2G - 0.25G^2}{G}\right)} \quad \text{(EQ 5)}$$

Eq (3) shows that for high $f_{filter}$ frequencies, the required active delay line length may become very short, and this could cause a frequency limitation. More importantly, Eq(5) shows that the only way to increase the Q for this purely active filter is to increase the gain G to its limiting value of 2. However, the limit to how close G can be made to 2 is determined by practical considerations which require that an adequate margin is maintained to prevent the onset of lasing. This has limited the practical Q that is realisable for the active filter to a value of around 325.

However, inspection of equation (2) also shows that the bandwidth of the response peaks can also be narrowed by increasing the delay time $T_{act}$ of the active delay line. Normally this is not an option, because for the purely active filter an increase in $l_{act}$ also lowers the fundamental frequency of the filter below the required value of $f_{filter}$.

In the topology of a first embodiment, the delay time of the active filter is increased by a factor N, so it operates at a fundamental frequency that is N times lower, but follow the active filter 5 by a p-section passive Mach-Zehnder lattice filter 6. The passive sections 11,12,13 are designed so that they produce a coincident pass frequency at $Nf_{act}$ to select the $N^{th}$ peak in the frequency response of the active delay line, but have notches to eliminate all the intermediate peaks. Hence the $N^{th}$ peak now coincides with the specified filter frequency $f_{filter}$. However, now the active filter 5 is operating with a much longer delay length, which from Eq(2) means a much narrower 3 dB bandwidth will result. This results in the Q of the hybrid filter being increased by a least a factor of N, in comparison to the purely active approach, for the same amount of gain margin.

For the hybrid structure, the transfer function is given by $$H_c(z) = K \frac{Z_{act} - Z_0}{Z_{act} - p_l} \prod_i \left(\frac{1}{2} \cdot \frac{z_i + 1}{z_i}\right) \quad \text{(EQ 6)}$$

where $z_{act}$ is used for the active delay line and $z_i$ (i=1,2,...) for passive notch delay line with different delay lengths.

Now for the hybrid filter $f_{1act\ is}$ chosen as $$f_{1act} = f_{filter}/N \quad \text{(EQ 7)}$$

and thus $$l_{act} = Nl'_{act} \quad \text{(EQ 8)}$$

The 3 dB bandwidth of the response peaks of the hybrid filter is given by $$\frac{(\cos\pi\Delta fT_1 + 1)(\cos\pi\Delta fT_2 + 1)(\cos\pi\Delta fT_3 + 1)}{1 - G\cos\pi\Delta fT_{act} + 0.25G^2} = \frac{4}{(1 - 0.5G)^2} \quad \text{(EQ 9)}$$

where $T_i = nl_i/c$; $l_i$; is the delay length difference of the $i^{th}$ Mach-Zehnder passive notch filter.

The passive section delay lengths $l_1$, $l_2$, $l_3$ are chosen to produce a coincident pass at the $N^{th}$ peak of the active filter which corresponds to $f_{filter}$ and notches to eliminate the intermediate peaks. Under these conditions the 3 dB bandwidth of the response peak arising from the active filter is virtually unaltered at the $f_{filter}$ frequency and its value is very well approximated by the expression $$\Delta f \approx \frac{1}{N}\Delta f'_{act} \quad \text{(EQ 10)}$$

The bandwidth of the fundamental peak at the filter frequency $f_{filter}$ is now N times smaller. Hence the Q of the hybrid filter is given by $$Q = N\frac{f_{filter}}{\Delta f'_{act}} = NQ' \qquad \text{(EQ 11)}$$

Hence for the same value of gain margin, the hybrid filter gives an N times increase in Q.

3. Synthesis

The design procedure for a filter which has a required fundamental bandpass frequency of $f_{filter}$ proceeds by setting $$f_{lhybrid} = f_{filter} \qquad \text{(EQ 12)}$$

The active filter delay length is $l_{act}$ is next chosen to give $$f_{lact} = f_{lhybrid}/2^n = f_{lhybrid}/N \qquad \text{(EQ 13)}$$

where n is an integer. The choice of the value of n depends on a tradeoff between the narrowness of the filter response and the number of passive notch filter sections required. The higher n is made, the longer the active length that can be used, which results in a narrower response peak when a given gain margin is used, Eq 2. However, increasing n also means that there are more intermediate peaks that must be eliminated so that only the $N^{th}$ peak of the response is selected, and this requires a larger number of passive notch filters.

For a chosen value of N, there are N−1 intermediate peaks that must be eliminated. This is done with a p-section passive filter. Each section of the passive filter is a 2-tap FIR structure which has notch frequencies at $$f_n = \left(i + \frac{1}{2}\right) \cdot \frac{N}{M} f_{act} \quad i = 0, 1, \ldots, M - 1 \qquad \text{(EQ 14)}$$

and pass frequencies at $$f_p = i\frac{N}{M} f_{act} \quad i = 0, 1, \ldots, M. \qquad \text{(EQ 15)}$$

The passive sections are chosen so that they have a coincident pass frequency at $Nf_{act}$ to select the $N^{th}$ peak in the frequency response of the active delay line, but have notches to eliminate all the intermediate peaks from 1 to N−1. The number of passive filter sections p required to do this is $$p = n \qquad \text{(EQ 16)}$$

Finally, the passive filter Mach-Zehnder length differences required in the p-section filter are $$l_{passive} = \frac{l_{act}}{2^{n-j}} \text{ where } j = 0, 1, 2, \ldots (n-1) \qquad \text{(EQ 17)}$$

As an example, in one embodiment, N=8 was chosen, thus n=3. The required active delay length is $$l_{act} = N\frac{c}{nf_{filter}} \qquad \text{(EQ 18)}$$

Figure 3:
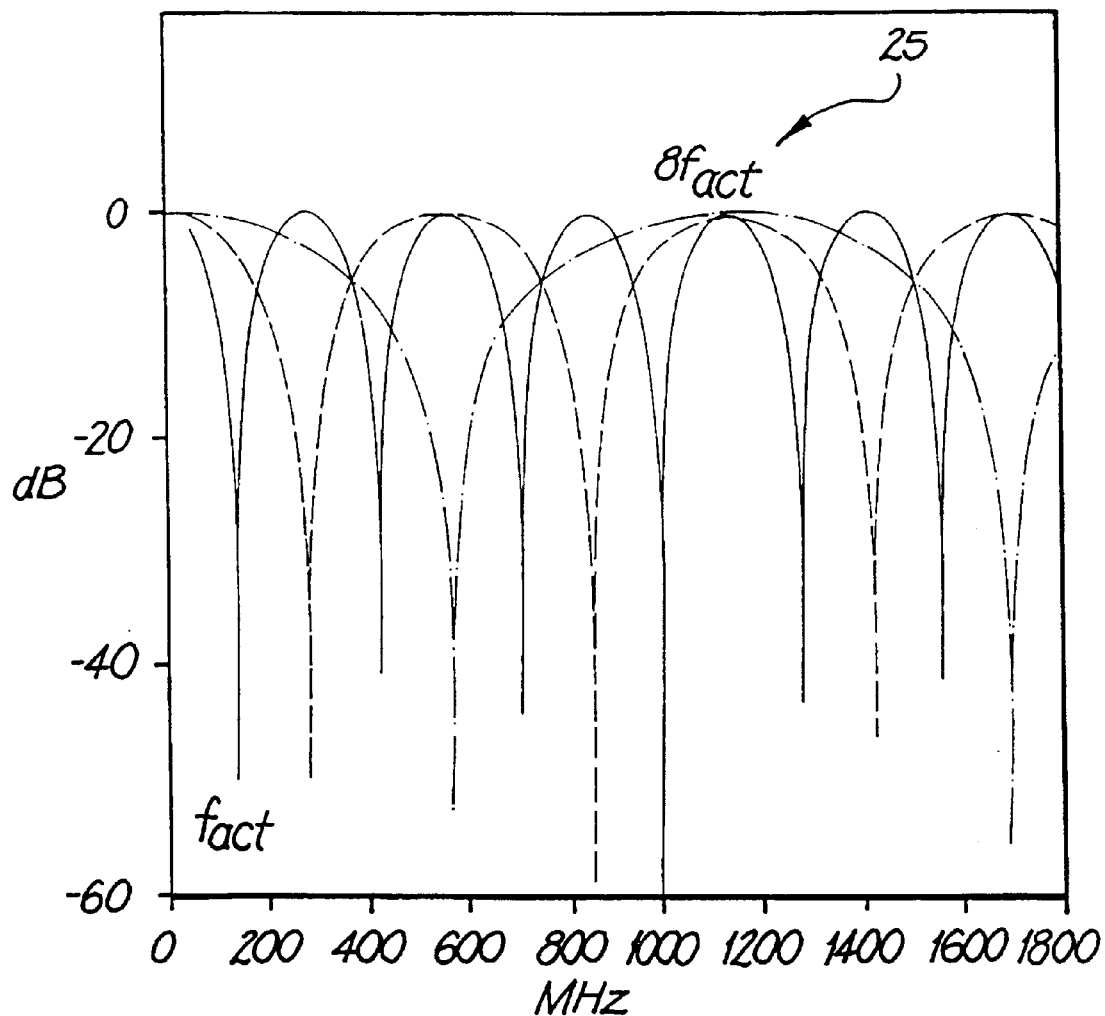
FIG. 3 illustrates a graph of the filter response of the passive components of the first embodiment.

Hence the hybrid filter frequency corresponds to the $8^{th}$ peak of the active delay line filter. A 3-section passive filter 6 is required. The delay length differences required in the 3-section passive filter are $\frac{1}{8}l_{act}$, $\frac{1}{4}l_{act}$ and $\frac{1}{2}l_{act}$. FIG. 2b shows the computed result for the hybrid filter designed to have an overall bandpass response at 1.1 GHz. FIG. 3 shows the computed responses for the three passive filter sections.

It can be seen that the passive sections have a coincident pass frequency 25 at the required filter frequency of 1.1 GHz but provide notches at the lower intermediate frequencies. Because this enables us to use an active delay line that is 8 times longer, compared to the length required if the active filter fundamental was directly at the specified filter frequency of 1.1 GHz, the passband peak at the filter frequency is at least 8 times narrower, and hence the Q is increased by at least 8 times. There is also additional rejection at out of band frequencies compared to a design using only a simple active filter.

4. Coherence Effects

The cascading of delay lines must ensure that there are no coherent interference effects. Hence there are requirements on the topology of the hybrid structure. The coherence length of laser must be less than the minimum delay path difference in all possible paths in the hybrid structure.

A key point about the topology shown in FIG. 1 is that it enables cascading of filters, without introducing interference problems. This is because the active delay line, which is an infinite impulse response (IIR) filter, is followed by finite impulse response (FIR) filters.

Figure 4:
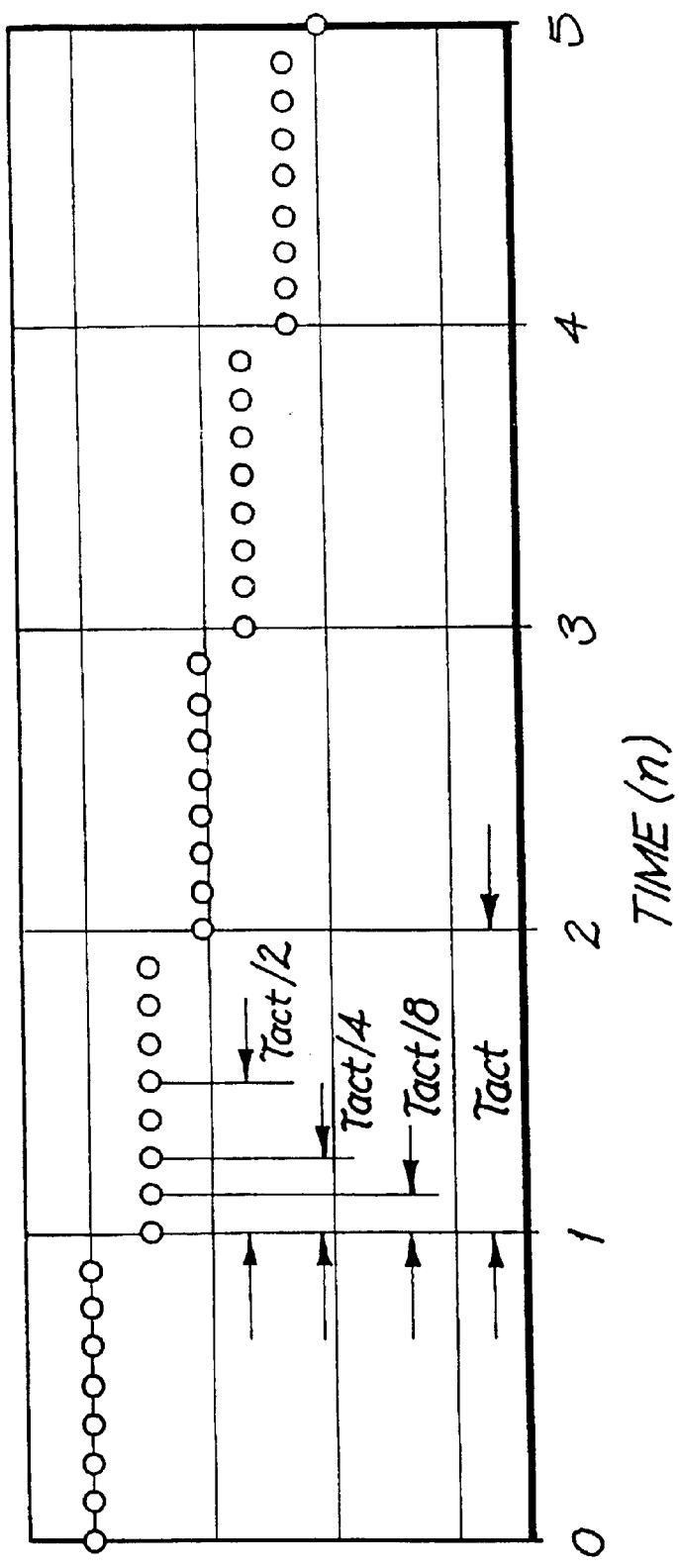
FIG. 4 illustrates the calculated impulse response of the preferred embodiment.

The multiple path lengths in the structure can be analysed by means of the impulse response. FIG. 4 shows the impulse response of the hybrid structure. The length of the active delay line sets the basic period $\tau_{act}$ of pulses. The 2-tap Mach-Zehnder FIR passive sections produce the in-between pulses. The p-section filter generates $2^p$ pulses, which are equally spaced within the period $\tau_{act}$. It can be seen that it is not possible for two pulses to arrive simultaneously, which means that no two paths can exist in the hybrid structure with the same lengths. The minimum pulse separation in this hybrid structure is $\tau_{min} = \tau_{act}/N$. This corresponds to the shortest delay time difference in the structure. Hence the coherence length of the laser source must be less than $l_{act}/2^n$. This was the case in the constructed embodiment, and no coherence interference effects were present.

5. Higher Order Passive Filters for Increasing the Q of the Hybrid Filter.

Figure 5:
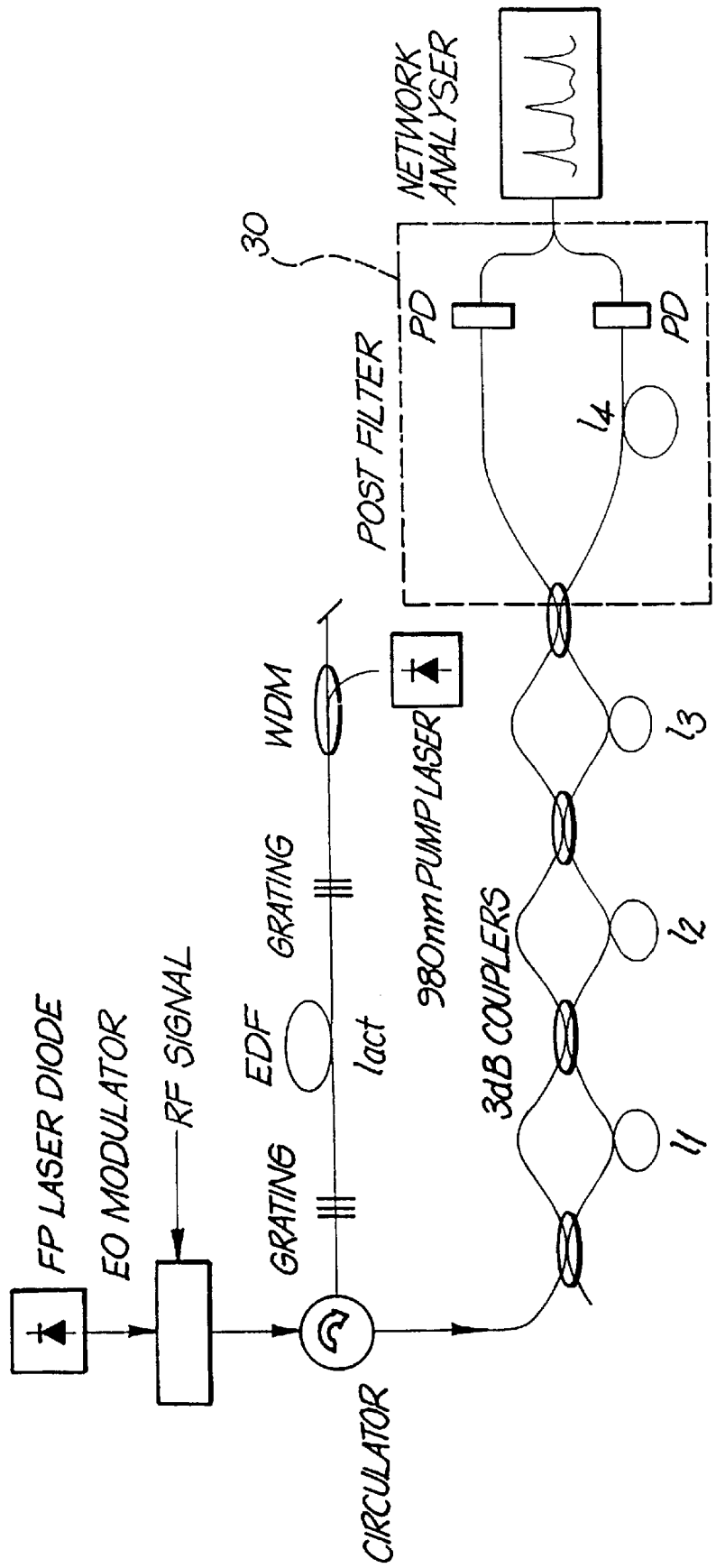
FIG. 5 is a schematic illustration of a second embodiment.

As an alternative embodiment, the Q of the hybrid filter can be further increased by adding an extra passive post-filter 30 as illustrated in FIG. 5, to form the last stage. In order to sharpen the response, a low fundamental frequency is chosen for the filter 30. Its delay length difference is chosen as $$l_4 = Kl_{act} \qquad (19)$$

where K is an integer. In order to avoid coherent interference effects in this structure, a two photodetector technique is used at the output.

The 3 dB bandwidth of the peak of this combined structure is given by $$\frac{(\cos\pi\Delta fT_1 + 1)(\cos\pi\Delta fT_2 + 1)(\cos\pi\Delta fT_3 + 1)(\cos\pi\Delta fT_4 + 1)}{1 - G\cos\pi\Delta fT_{act} + 0.25G^2} = \frac{8}{(1 - 0.5G)^2} \qquad \text{(EQ 20)}$$

Substantial narrowing of the response and hence increase in Q. can be obtained with the inclusion of the post-filter 30 with a large delay difference.

6. Implementation and Results

The hybrid filter structure 1 shown in FIG. 1, was set up to operate at a fundamental frequency of 1.1 GHz. The active delay line filter 5 comprised a 50% reflectivity grating 9 and a 100% reflectivity grating 8 at the signal wavelength of 1558 nm, and each had a spectral width of 0.5 nm. The parameter N (=$2^n$) of the hybrid filter was chosen as 8. Hence the fundamental frequency of the active filter was 0.14 GHz, and this corresponds to a single pass optical delay of 73 cm for the active filter. This structure has practical dimensions, and was implemented with erbium doped active fibre pumped by a 980 nm laser 7.

The number of passive sections 11,12,13 required p=n=3, and this was implemented with unbalanced Mach-Zehnder sections, with length differences for each section as given by Eq (17). The delay line length differences need to be implemented accurately so that the notch frequencies match the peaks to be eliminated, however this is not difficult to implement because the tolerances are within the RF wavelength. The coherence length of the laser source was less than the shortest delay difference in the hybrid filter and the signal wavelength was 1558 nm.

Figure 6:
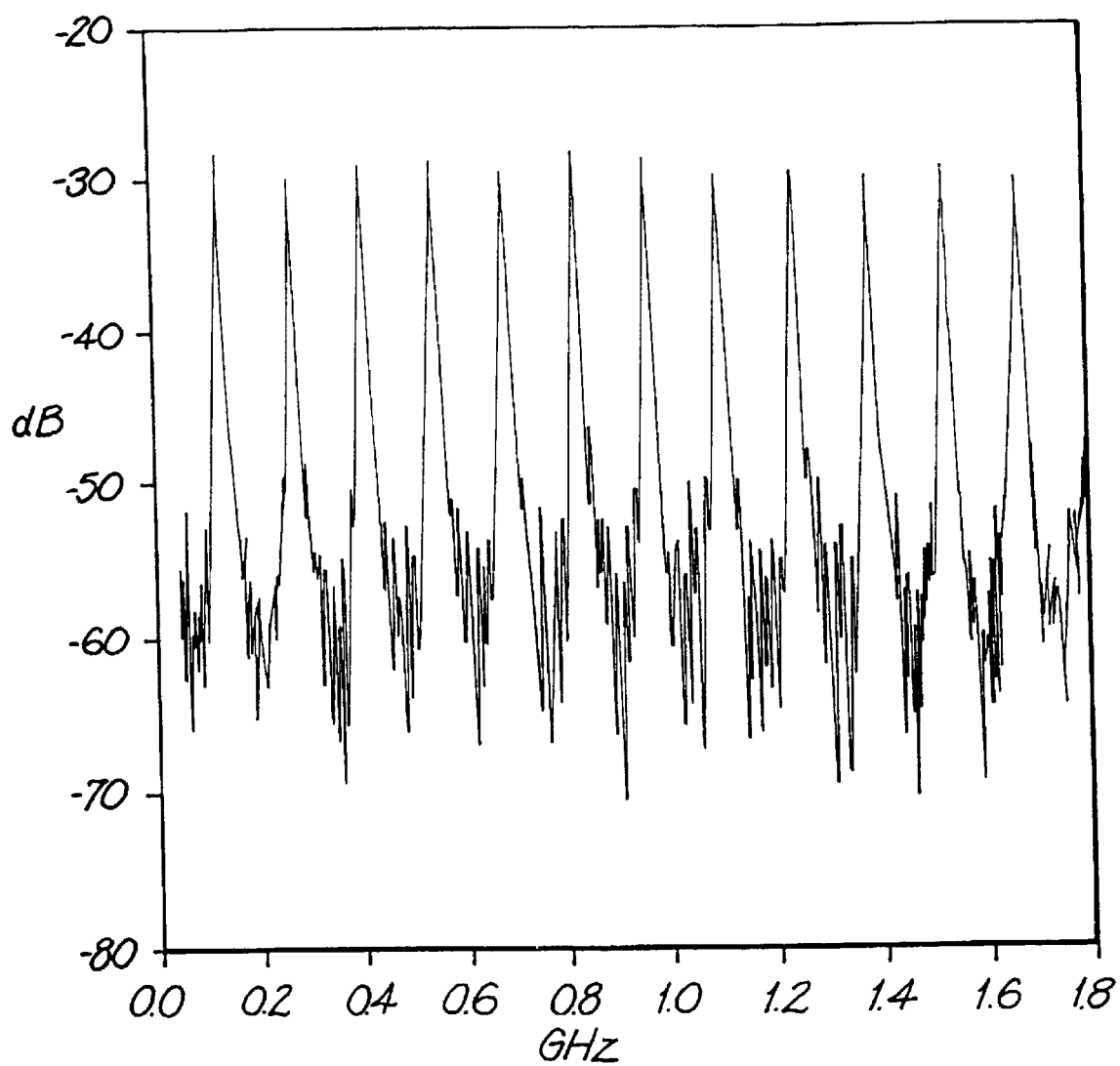
FIG. 6 illustrates the measured frequency response of the active filter of the first embodiment.

FIG. 6 shows, as a reference, the measured frequency response of the active filter embedded in the hybrid structure. This has fundamental frequency of 141 MHz, as expected. The measured 3 dB bandwidth of the peak is 1.475 MHz. Using Eq 2, this corresponds to a double pass optical gain of G=1.935, which provides an ample gain margin from lasing and gives very stable operation.

Figure 7:
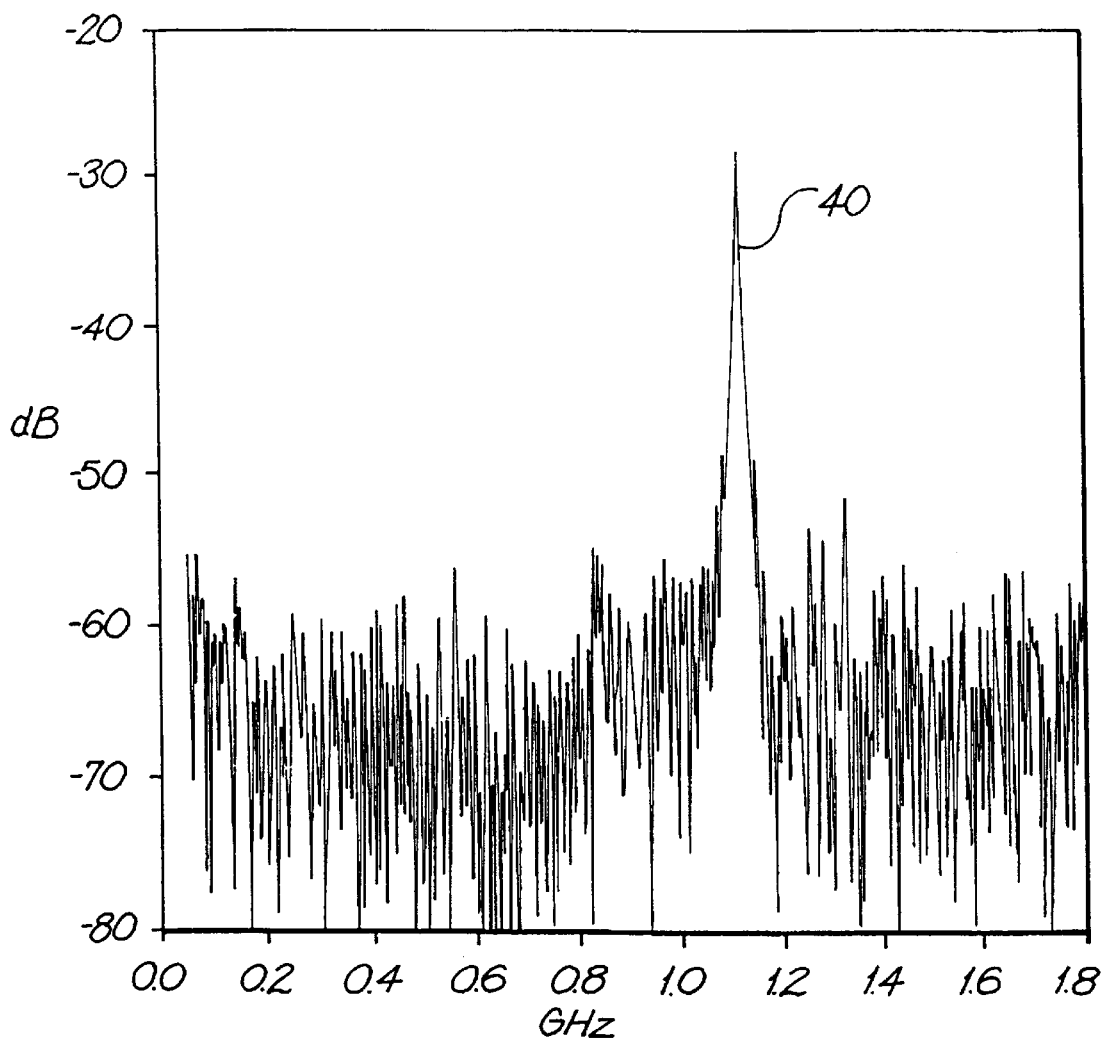
FIG. 7 illustrates the measured frequency response of the first embodiment.

The measured frequency response of the hybrid filter, comprising the active delay line and 3 passive filter sections, is shown in FIG. 7. The fundamental frequency of the response peak 40 is 1.13 GHz, and its 3 dB bandwidth is 1.41 MHz. The resulting Q value is 801.4. In a comparison between the measured and predicted (using Eq. 9) values of bandwidth and Q, excellent agreement was found.

Figure 8:
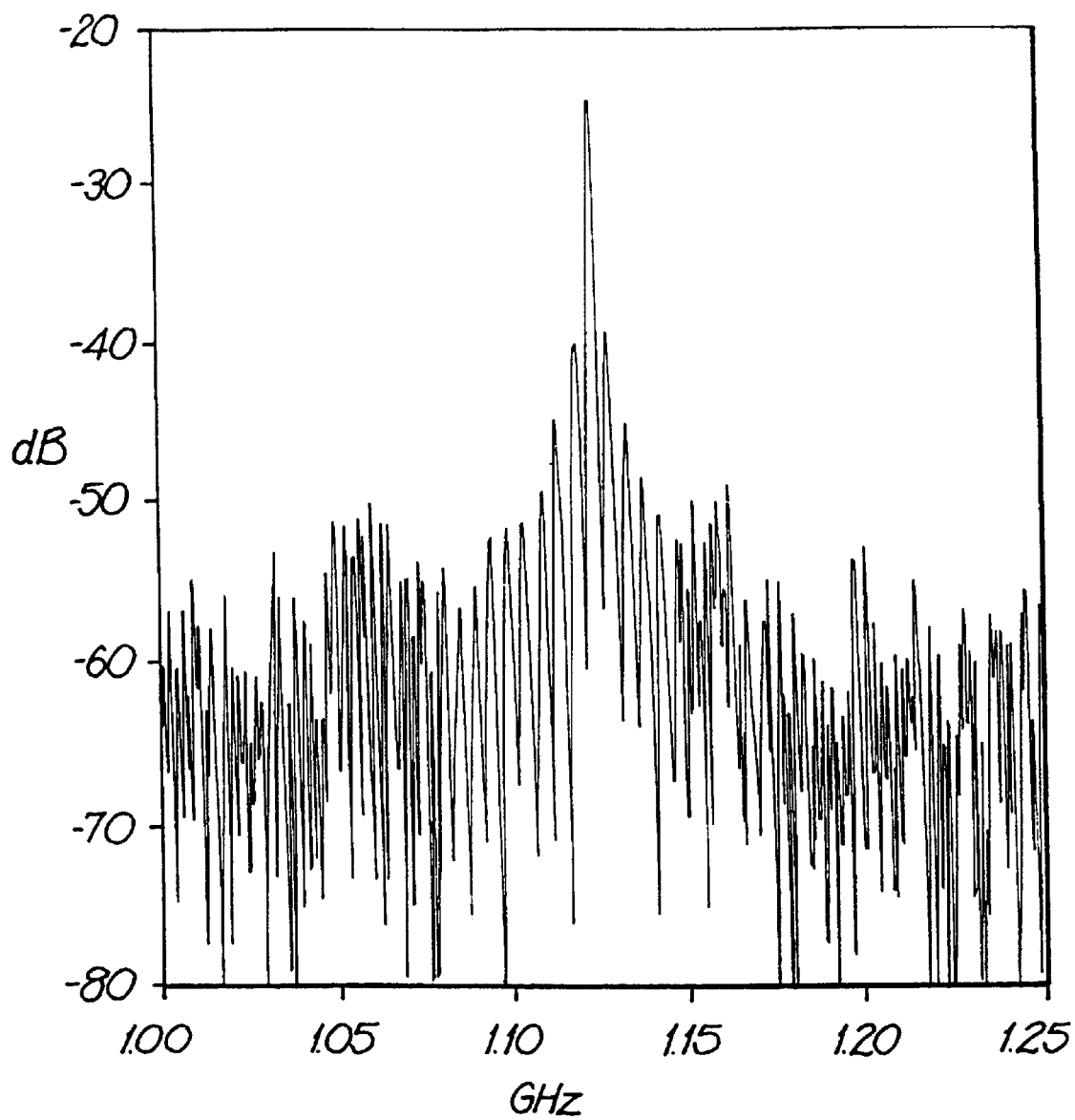
FIG. 8 illustrates the measured frequency response of the second embodiment.

FIG. 8 shows the measured frequency response of the hybrid filter including a post-filter 30, as displayed in FIG. 5. The path length difference in the post-filter is $l_A = 36\, l_{act}$. The measured 3 dB bandwidth of the peak is reduced to 1.15 MHz, and the Q is increased to 982.6, however the skirt selectivity is not as high because of the limited selectivity of the post-filter. This shows that the post-filter can effectively sharpen the response of the hybrid processor even more. The following table shows a comparison between measured and predicted (using Eq. 20) values of bandwidth and Q and this displays excellent agreement:

|  | $f_{1st}$(MHz) | $\Delta f_{3dB}$(MHz) | Q |
| --- | --- | --- | --- |
| Hybrid with $L_A$ (Measured) | 1130.0 | 1.150 | 982.6 |
| Hybrid with $L_A$ (Measured) | 1128 | 1.145 | 986.6 |

It can therefore be seen that the preferred embodiments provide for a new hybrid active-passive photonic signal processor, which achieves high-Q microwave bandpass filtering. This results in both a large increase in Q and a high frequency of operation. The structure is based on a hybrid approach comprising both active and passive sections. The active section, is operated at a sub-multiple of the desired filter frequency, and thus achieves a much narrower 3 dB bandwidth response, for a given gain margin. The passive sections eliminate the intermediate peaks and select the multiple corresponding to the desired filter frequency. This concept has the advantage of keeping the narrower bandwidth that can be produced with the longer active delay length, while still operating at a much their frequency. It thus significantly reduces the limit of lasing threshold of the active delay line, and enables the processor to function with a large gain margin, yet still produces a high Q. This results in very robust operation, together with high resolution filtering.

The general synthesis procedure for the hybrid filter has been described and an embodiment experimentally verified by demonstrating an active filter operating at the $8^{th}$ sub-multiple of the frequency, and a 3-section passive filter. This novel filter, operating at a fundamental frequency of 1.1 GHz, exhibited a Q of 801. Moreover, using an extension to this principle to include an additional passive optical stage, results demonstrated a narrowband filter response with a Q of 983. This hybrid structure is simple, and the passive sections can be implemented with simple fibre delay lines. The hybrid filter topology offers high-resolution microwave optical signal processing with high time-bandwidth operation.

Figure 9:
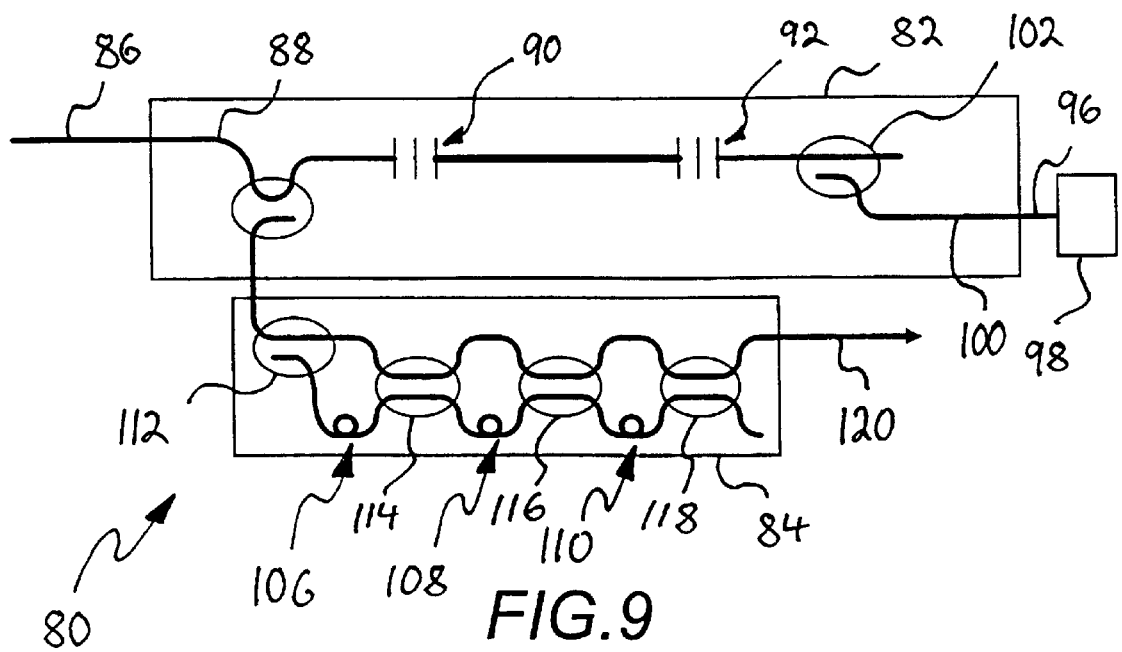
FIG. 9 illustrates a third embodiment.

Turning now to FIG. 9, in an alternative embodiment, the filter 80 comprises optical planar integrated circuits 82, 84 for the active and passive filter component respectively.

The RF modulated light signal 86 is coupled into a planar waveguide 88 of the active filter circuit 82. The planar waveguide 88 comprises two waveguide gratings 90, 92 between which an erbium doped portion of the planar waveguide 88 is provided as the active delay line path between the gratings 90, 92. The first grating 90 has a reflectivity of 50%, whereas the second grating 92 has a reflectivity of 100%.

A pump laser signal 96 from a pump laser 98 is coupled into a planar waveguide 100 of the active filter circuit 82 and is coupled to the waveguide 88 by means of a WDM coupler 102.

A 3 dB coupler 104 is used to forward the output from the active filter circuit 82 to the passive filter circuit 84.

The passive filter circuit 84 consists of a cascade of filters 106, 108, 110, which each comprise optical waveguide delay lines between 3 dB couplers 112, 114, 116 and 118 of the passive filter circuit 84, with the processed light signal 120 being coupled out of the planar passive filter circuit 84.

The active and passive filter circuits are formed on separate substrates, which could for example be silica glass. However, it will be appreciated by a person skilled in the art that other suitable substrates may be used and/or that the active and passive integrated circuits can be provided on a single substrate.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

We claim:

1. A bandpass signal filter for filtering modulation frequencies of a modulated optical input signal, comprising:
    a photonic bandpass active filter arranged in use to operate at a fundamental frequency which is a sub-multiple of a desired filter frequency of the bandpass filter; and
    a photonic passive filter arranged in use to eliminate all intermediate pass bands in the frequency response of the active filter except the pass band at the desired filter frequency for providing the pass band signal of the bandpass filter.

2. A bandpass filter as claimed in claim 1 wherein said bandpass filter operates at microwave frequencies.

3. A bandpass filter as claimed in claim 2 wherein the input signal is modulated by a microwave frequency optical oscillator.

4. A bandpass filter as claimed in claim 1, wherein said passive filter comprises a number of passive filter elements each comprising a notch filter which in combination, have high attenuation characteristics for frequencies outside said desired filter frequency and low attenuation of said desired filter frequency.

5. A bandpass filter as claimed in claim 4 wherein the number of passive filter elements is 3.

6. A bandpass filter as claimed in claim 1, further comprising a post filter interconnected to said passive filter, said post filter element providing for further rejection of non desired filter frequencies.

7. A bandpass filter as claimed in claim 1, wherein said active filter comprises an infinite impulse response filter and said passive filter comprises a finite impulse response filter.

8. A bandpass filter as claimed in claim 1, formed from optical fibre components.

9. A bandpass filter as claimed in claim 1, formed from optical planar integrated circuits.

10. A photonic signal processor having a bandpass signal filter as claimed in claim 1, wherein said photonic signal processor has a quality factor in excess of about 500.

* * * * *